United States Patent

Farrugia et al.

(10) Patent No.: US 8,140,809 B2
(45) Date of Patent: Mar. 20, 2012

(54) COMPUTER IMPLEMENTED MASKED REPRESENTATION OF DATA TABLES

(75) Inventors: Augustin J. Farrugia, Cupertino, CA (US); Mathieu Ciet, Paris (FR); Pierre Betouin, Boulonge (FR)

(73) Assignee: Apple Inc., Cupertino, CA (US)

( * ) Notice: Subject to any disclaimer, the term of this patent is extended or adjusted under 35 U.S.C. 154(b) by 440 days.

(21) Appl. No.: 12/475,377

(22) Filed: May 29, 2009

(65) Prior Publication Data

US 2010/0306497 A1 Dec. 2, 2010

(51) Int. Cl.
G06F 13/00 (2006.01)
(52) U.S. Cl. ....................................... 711/170
(58) Field of Classification Search .................. 711/170
See application file for complete search history.

(56) References Cited

U.S. PATENT DOCUMENTS

| | | | |
|---|---|---|---|
| 6,081,665 A * | 6/2000 | Nilsen et al. | 717/116 |
| 7,694,151 B1 * | 4/2010 | Johnson et al. | 713/189 |
| 2010/0054459 A1 * | 3/2010 | Ciet et al. | 380/28 |
| 2010/0106920 A1 * | 4/2010 | Anckaert et al. | 711/154 |
| 2010/0306497 A1 * | 12/2010 | Farrugia et al. | 711/202 |
| 2011/0116624 A1 * | 5/2011 | Farrugia et al. | 380/28 |
| 2011/0167221 A1 * | 7/2011 | Pangal et al. | 711/117 |
| 2011/0167407 A1 * | 7/2011 | Betouin et al. | 717/120 |

* cited by examiner

*Primary Examiner* — Huan Hoang
*Assistant Examiner* — Jay Radke
(74) *Attorney, Agent, or Firm* — Morrison & Foerster LLP

(57) ABSTRACT

In the computer software field, method and apparatus to obfuscate (mask or hide) computer data which is part of or accessed by a computer program. The method protects (hides) accesses to tables of data in terms of the place or position of each element in the table. It does this by providing an intermediate table which describes the positions of the elements of the first table or tables, but in a transformed (modified) fashion.

31 Claims, 3 Drawing Sheets

| Starting Address | Length (TLen) | Function f |
|---|---|---|
| ' ' ' ' ' ' ' | ' ' ' ' ' ' ' | ' ' ' ' ' ' ' |

FIG. 2

COMPUTER IMPLEMENTED MASKED REPRESENTATION OF DATA TABLES

FIELD OF THE INVENTION

This disclosure describes a way to mask (hide or obfuscate) computer data and code against reverse engineering attacks.

BACKGROUND

Nowadays, there are more and more uses of computer software applications (programs) where the user may also be interested in learning information about the software code which is executed on his computing device. This is, for instance, the case with DRM (Digital Rights Management) applications, used to protect songs, games, applications, or any digital content, against fraud (such illegal copying, spreading content over P2P networks, etc.). Such a user could be interested in (illegally) trying to copy songs, applications or games in order to redistribute them.

Of course, the role of the content distributor or owner is to protect the content against such malicious users ("hackers"). Various known means are used to achieve this goal. One is code obfuscation. Code obfuscation is a well known technique where source code in a computer programming language is made difficult to understand.

SUMMARY

As explained above, there is a known need for code obfuscation to protect content against illegal or unauthorized uses. The present inventors have recognized that also object (compiled) code tables of data (also called arrays in the code) have to be protected.

The first need is to protect the data content itself, especially for those data tables containing critical information. This is mostly achieved currently by the use of masks and various other processes. Just as an illustrative example, consider a table with data. Instead of storing data as is, it is stored using a masking function. The associated unmasking process is only done when a given variable of the table has to be used, in a first known solution. In a second known solution, the data is used as masked/protected but the process is adapted to include this kind of mask.

In all the cases, retrieving the original data reverses the process. Sometimes also performing a complementary dynamic analysis speeds up the process. This means accessing the code at run time (execution time) since the unmasking operation is only done upon execution.

The second need, and this is a goal of this disclosure, is to protect the table accesses themselves. When a table of data is involved in a process, this protects the data contained inside this table, and also the place/position in the table of each data item or element. This approach can also be combined with and is not exclusive to methods involving the masking of the data itself.

Hence contemplated in accordance with the invention is the method for obfuscating the code, the associated computer software tool that does the obfuscating and is embodied in a computer program product stored in computer memory, the associated programmed computing apparatus that does the obfuscating, and the resulting obfuscated code embodied in a computer program product stored in computer readable memory. Also contemplated is the inverse method of executing the obfuscated code so as to de-obfuscate it, the associated programmed computing apparatus, and the resulting de-obfuscated code embodied in a computer program product stored in a computer readable memory.

BRIEF DESCRIPTION OF THE FIGURES

FIG. 2 shows a master table in accordance with the invention.

DETAILED DESCRIPTION

Figure 1A:
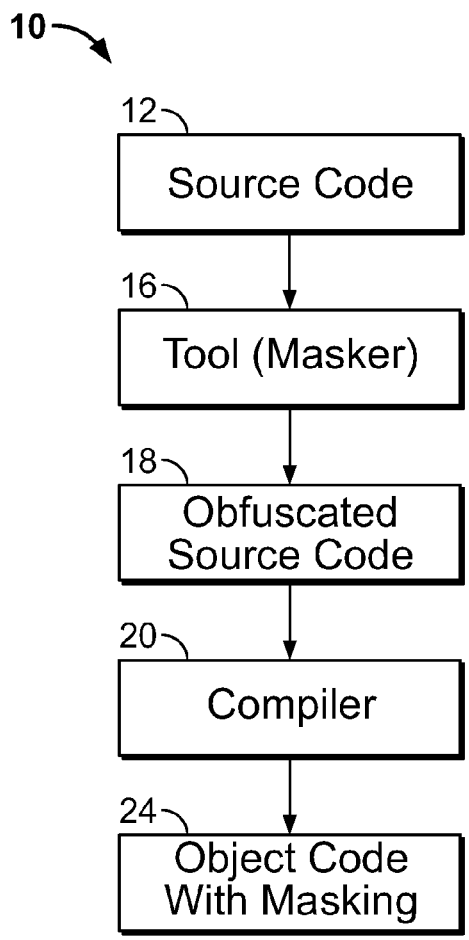
FIGS. 1A, 1B show use of the present invention.

Consider a table of data designated T having a number designated tLen of entries of any data type. There are various ways to access the table. The first and the most simple way is to use the table as T directly. This operation is specified in the C computer language as: Table[position] to access the next position (entry). The second way is to define a memory pointer at a given position of T (address of T). Let ptrT designate this memory pointer. In a non-protected implementation, the x element (xth entry) of T is accessed by reading T[x] (which is equivalent to ptrT+x).

In accordance with the invention, an intermediate table is provided which stores the positions of the data elements which need to be used for each data table. This is the principle of modified indexes. Consider the previously described data table T; and denote f as the function used to "shuffle" (transform) the accesses/positions of the table elements. This function has to be invertible and is used to create a bijection between two groups of tLen elements (where as stated above tLen is the number of the elements in the table). Denote fInv as the inverse function of function f. Table T is transformed (shuffled) into IT with the use of the pre-defined f function.

Accessing the element numbered a inside the data table T is done as (again expressed logically):

$$b=T[a]$$

(where b is not the a element if table T is shuffled.)

But in accordance with the invention, this operation is replaced by:

$$b=f\text{Inv}(a)$$

As seen, there is no particular difficulty in carrying this out in computer software and the resulting change inside the source code is minimal. The advantage is the protection of the data element against a static analysis by an attacker. When the present pointer principle is used in a sub-function where T is defined (using ptrT instead of T directly), this attack technique is much harder because the starting position (address in memory) of the data table is unknown.

The length of the table is unknown in the sub-function and the starting point (address) is also not known. This is however necessary to access the table since the pointer just gives an address in the (logical) memory. Therefore the present approach masks a data table very efficiently and is able to manage pointers.

Figure 2:
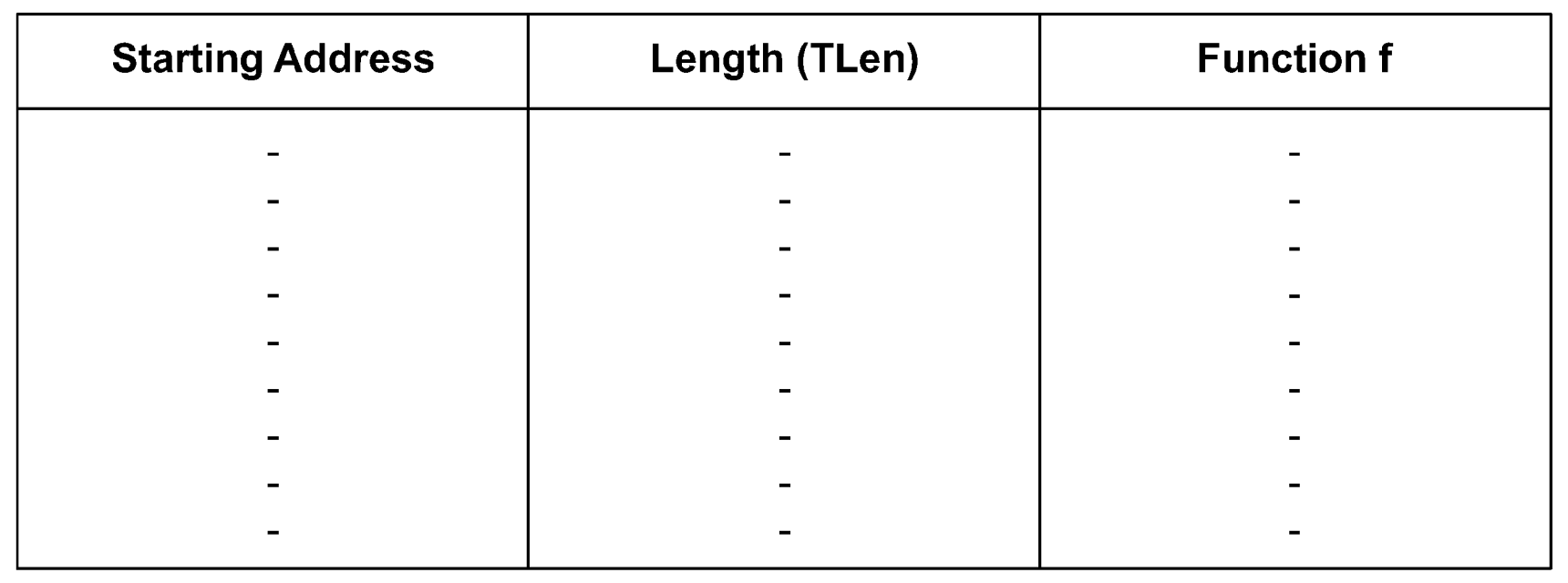

Given all the data tables (where table also refers here to data arrays) T in a particular piece of software, at the compilation time of the source code of the piece of software, through a software "tool" (program), one generates a table of masks which will later contain the starting addresses of each of the tables T, the length tLen of each of the tables and a description of the functions f used to mask the addresses for each table T. Denote this table of masks as masterTable; it is depicted graphically in terms of its organization in FIG. 2. Note that the addresses are not available at compilation time;

they are loaded into the tables at run time. So the memory room for masterTable is allocated at (code) compilation time; post-compilation which is before or during code run (execution) time, the table entries are used to identify the pointers.

This process 10 of obfuscating the code is shown in FIG. 1A, beginning with conventional source code 12 for a particular application, coded in any convenient programming language. The source code 12 is applied to the present obfuscating tool 16, resulting in the obfuscated source code 18. This source code 18 is then subject to conventional compiler 20 (each non-interpreted computer programming language conventionally has its own compiler.) The result is the masked (obfuscated) object code 24. Of course this process of FIG. 1A takes place in a computer with relevant code and data being stored in computer memory and the tool 16 being itself executed by the computer processor. The tool can be integrated into the compiler. The tool can also produce a result in another programming language.

The software tool 16 processes the source code 12 to be masked in the following manner. When a table pointer requiring obfuscation is detected in the original (unmasked) source code 12 by the tool 16 (via specific annotations provided or present for instance in the original source code), the tool 16 modifies the occurrence of the pointer in the source code 12 with a call to a software handler function. (Handlers are well known generally; they are asynchronous and generic callback subroutines.) The table of masks denoted masterTable is then also updated if needed (one needs to update the masterTable each time a pointer to a new buffer—a memory location—is detected).

As shown in FIG. 1A, at the time of (otherwise conventional) compilation of the source code into object (compiled) code, the tool translates the raw information provided from the source code files (pointers, arrays, etc.) into obfuscated pointer information. Two cases are thus possible: direct pointer references to arrays/tables, or absolute pointers. In each of these two cases, the tool statically parses the source code searching for pointers to obfuscate. Then if a buffer is already filled, the tool transforms it using one f transformation function as described above. (There can be as many f functions as the number of transformed tables.)

Figure 1B:
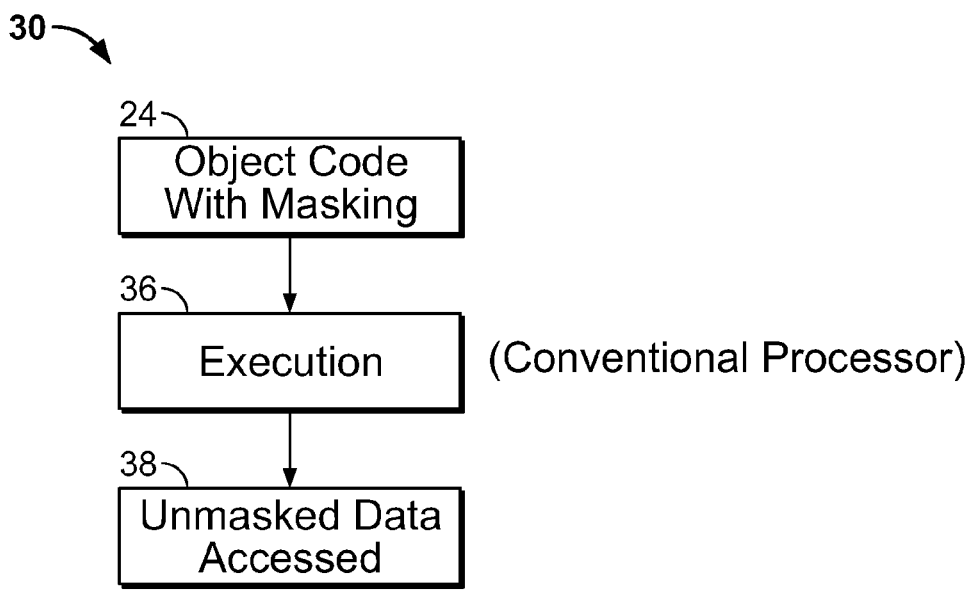

During the later execution of the obfuscated (masked) software compiled in this way and now in object code (compiled) form, the execution process 30 shown in FIG. 1B is as follows. When a pointer has to be used, the handler present in the compiled (object) code 20 is executed at 36 and actually resolves the obfuscated pointers by accessing masterTable, the table of masks. MasterTable is allocated at the time of compilation and filled post-compilation by the tool as explained above. The table entry information (which includes an address and length of the table for that pointer) is then used to identify the buffer which "owns" the pointer. From this point, the f function corresponding to the buffer is fetched from the table entry and the original offset value of the pointer is thereby retrieved to restore the unmasked data at 38. Note that when the bijection referred to above is used, its image function is known. This image is included in the code or retrieved from masterTable at execution time.

Given a data table T (with the corresponding masking information stored in the masterTable), consider a pointer pointing to a given position of the original table T: ptrT. Instead of using this pointer prtT directly, the masterTable is accessed. Using ptrT and the associated table T length (tLen) recovered from the masterTable, it is possible to define in which element in which table T pointer ptrT+x is pointing to. Then, using the associated function f also recovered from masterTable, b=T[a] can be replaced to access the correct position of the shuffled table.

Consider an example in the following data table T in which table T is a 10-Byte long table, starting in the offset value 0x1234 (first entry, top row). This means the table ends at offset value 0x123E. Let the f function (for transforming the pointer indexes) be the multiplication by 3 modulo the length of the table T. Function fInv is therefore defined as the multiplication by 7 modulo 10. This means the second element of the table (at 0x1235, second element top row) is stored at 0x1237 (second element, bottom row). This table T illustrates this, by showing the link between the original starting address (top row) and the modified starting address (bottom row). Note that this table does not represent the values stored at each address:

| 0x1234 | 0x1235 | 0x1236 | 0x1237 | 0x1238 | 0x1239 | 0x123A | 0x123B | 0x123C | 0x123D |
|--------|--------|--------|--------|--------|--------|--------|--------|--------|--------|
| 0x1234 | 0x1237 | 0x123A | 0x123D | 0x1236 | 0x1239 | 0x123C | 0x1235 | 0x1238 | 0x123B |

Suppose the pointer ptrT is pointing to the third element of table T, and the process is only working with the table elements from the third to the tenth. If the pointer in the original source code was pointing to the element 0x1236, with the masking of the addresses this is pointing now to element 0x123A. Given a pointer, it is always possible to determine the starting address because the f function is a bijection over a finite group with a number of elements equal to the length of the table T.

In one embodiment, unmasking operation of the addresses can be done on-the-fly during the execution time. As explained above, during the code generation process the software tool has been used to change a simple access to a more complicated process to access to a masked address based on the f function and the masterTable.

With this solution, each time a data table or a part of a data table is accessed, the code is modified (before or during the source code compilation) to access the right position. All this can be done without changing the original source code on the developer (source code) side and only by the dedicated tool used at or immediately before the compilation into object code. Note also this tool can be used to modify the static constants (data) stored in the data tables by rewriting the data where needed.

A typical transformation (shuffling) function f for modifying the addresses is the use of affine transformations defined modulo the number of elements of the table applied to the position index, expressed logically as (the multiplicative element of the affine transformation being co-prime with the number of elements of the table):

elementNumberindex=originalAddresse+$f$(index)

Another suitable such function is a permutation table, for example.

Another advantage of this solution is to provide a copy of the data table inside another data table of the same length. This is carried out in two steps. The first one is to recopy the table from its first element to its end for instance. The first element in the table is accessed as T[0] in the C computer language, for instance. Then, a simple update of the masterTable is necessary. It is also sometimes needed to recopy a table inside another table and to complete it for future treatments (appending data). This can be done easily and efficiently by first recopying the existing table at the beginning (this is not restrictive) and then completing the remaining part of the table using another transformation function, by updating the table only for the appended part. This means the new table is just considered as a set of two consecutive tables with specific dedicated modified addresses. Such an operation is impossible with prior solutions. Note also that table T can be enlarged and the added entries filled with padding (meaningless) values.

Another advantage of the present solution is the completely free possibility for the transformation function f associated with each pointer address and the length. This function can be quite complex, and can be changed depending on the tables (that is, differ for each table). One can also use a specific function to assemble two data tables (concatenation). Suppose the shuffling (transformation) of two data tables T1 and T2 is affine. Then it is easy to find a function such that the table T1 elements are shuffled over the odd positions, whereas the table T2 elements are shuffled over the even positions. It can, of course, be more complex.

Given this description, coding the above described software tool in any convenient computer language would be routine, as would be combining that tool with conventional source code compilation. The tool is used prior to conventional compilation, or is part of the compiler. The resulting compiled code would then execute conventionally, resulting in transparency to the ultimate end user of the obfuscated software application, and no special software or hardware modifications are needed to that end user's computing device.

The following shows for one embodiment variables and parameters used in the above software tool:

| | | |
|---|---|---|
| T | Array/Table | Table/Array, most of the time referenced as T[IndexValue] |
| ptrT | pointer | Pointer to the Table/Array T |
| tLen | Integer | Length of the Table/Array T |
| x | integer | Offset value in the Table/Array |
| T[x] | type of array element | Element x in the Table T |
| f | function | Shuffling function |
| fInv | function | Unshuffling function |
| fT | Array/Table | Table/Array T, which has been shuffled (processed) |
| masterTable | Array/Table | Table containing starting addresses of arrays and their associated length |

Figure 3:
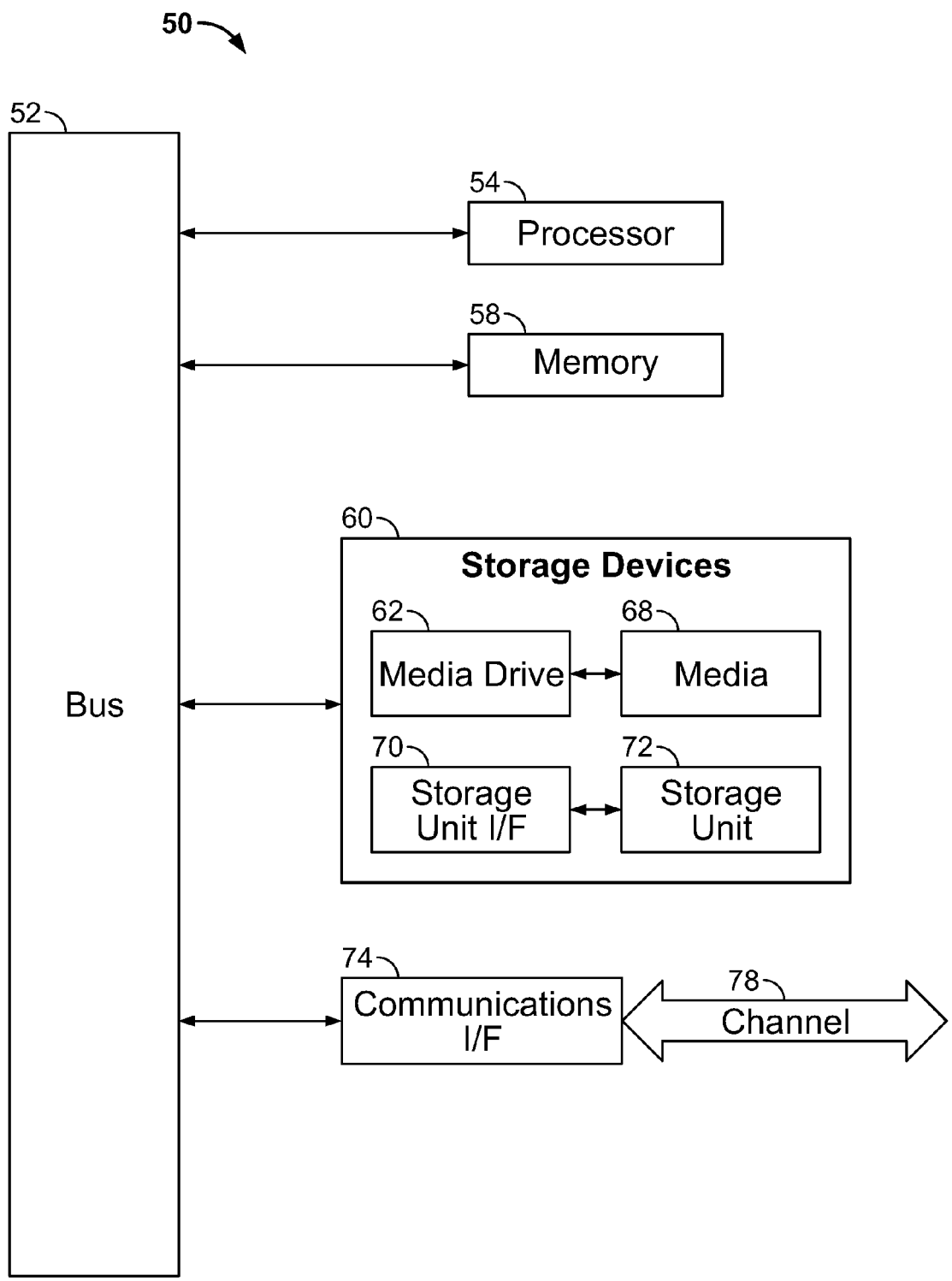
FIG. 3 shows a conventional computing device used with the invention.

FIG. 3 illustrates a typical and conventional computing system (apparatus) 50 that may be employed to implement processing functionality in embodiments of the invention. Computing systems of this type may be used in a computer server or user (client) computer or other computing device, for example. With reference to the present invention and present FIG. 1, this computing system may be the computer that executes the software tool or the end user computer that executes the resulting compiled code. Those skilled in the relevant art will also recognize how to implement embodiments of the invention using other computer systems or architectures. Computing system 50 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 50 can include one or more processors, such as a processor 54. Processor 54 can be implemented using a general or special purpose processing engine such as, for example, a microprocessor, microcontroller or other control logic. In this example, processor 54 is connected to a bus 52 or other communications medium.

Computing system 50 can also include a main memory 58, such as random access memory (RAM) or other dynamic memory, for storing information and instructions to be executed by processor 54. Main memory 58 also may be used for storing temporary variables or other intermediate information during execution of instructions to be executed by processor 54. Computing system 50 may likewise include a read only memory (ROM) or other static storage device coupled to bus 52 for storing static information and instructions for processor 54.

Computing system 50 may also include information storage system 60, which may include, for example, a media drive 62 and a removable storage interface 70. The media drive 62 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), flash memory, or other removable or fixed media drive. Storage media 68 may include, for example, a hard disk, floppy disk, magnetic tape, optical disk, CD or DVD, flash memory or other fixed or removable medium that is read by and written to by media drive 62. As these examples illustrate, the storage media 68 may include a computer-readable storage medium having stored therein particular computer software or data.

In alternative embodiments, information storage system 60 may include other similar components for allowing computer programs or other instructions or data to be loaded into computing system 50. Such components may include, for example, a removable storage unit 72 and an interface 70, such as a program cartridge and cartridge interface, a removable memory (for example, a flash memory or other removable memory module) and memory slot, and other removable storage units 72 and interfaces 70 that allow software and data to be transferred from the removable storage unit 68 to computing system 50.

Computing system 50 can also include a communications interface 74. Communications interface 74 can be used to allow software and data to be transferred between computing system 50 and external devices. Examples of communications interface 74 can include a modem, a network interface (such as an Ethernet or other network interface card (NIC)), a communications port (such as for example, a USB port), a PCMCIA slot and card, etc. Software and data transferred via communications interface 74 are in the form of signals which can be electronic, electromagnetic, optical or other signals capable of being received by communications interface 74. These signals are provided to communications interface 74 via a channel 78. This channel 78 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 58, storage device 68, or storage unit 72. These and other forms of computer-readable media may store one or more instructions for use by processor 54, to cause the processor to perform specified operations. Such instructions, generally referred to as "computer program code" (which may be grouped in the form of computer programs or other groupings), when executed, enable the computing system 50 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 50 using, for example, removable storage unit 72, drive 62 or communications interface 74. The control logic (in this example, software instructions or computer program code), when executed by the processor 54, causes the processor 54 to perform the functions of embodiments of the invention as described herein.

This disclosure is illustrative and not limiting; further modifications will be apparent to those skilled in the art in light of this disclosure and are intended to fall within the scope of the appended claims.

The invention claimed is:

1. A method of masking data, the data being in a set of computer instructions stored in computer readable memory, using a processor coupled to the computer readable memory, the method comprising the acts of:
   providing a first table of data in a first portion of the computer readable memory, wherein the first table has a length and an allocation in the first portion of the computer readable memory;
   the processor detecting a pointer to a location in the first table in the set of computer instructions;
   the processor modifying the detected pointer in the set of computer instructions, so the detected pointer is modified by a transformation function;
   storing the modified pointer in an entry in a second table in a second portion of the computer readable memory, the entry including the allocation and length of the first table; and
   storing the set of computer instructions and the second table in a third portion of the computer readable memory.

2. The method of claim 1, wherein the set of computer instructions includes a third table of data and a second pointer to the third table of data, and further comprising applying the method to the third table of data.

3. The method of claim 1, wherein the transformation function is one of an affine transformation, a multiplication by a modulus of a length of the first table, or a permutation.

4. The method of claim 1, wherein the act of modifying the detected pointer includes invoking a handler.

5. The method of claim 1, wherein the transformation function is a bijection.

6. The method of claim 1, wherein each entry in the second table also includes the transformation function for that pointer.

7. The method of claim 1, wherein the pointer is an absolute or an offset pointer.

8. The method of claim 1, wherein the method is performed for all pointers only during initialization of the set of computer instructions.

9. The method of claim 1, wherein the method is performed for each access to the first table.

10. The method of claim 1, further comprising the acts of:
    providing a third table of data; and
    applying the transformation function to the first and third tables of data, thereby to concatenate the tables.

11. The method of claim 1, wherein additional data is appended to the first table, thereby being a third table; and wherein the method further comprises the act of applying a transformation function only to the additional data in the third table.

12. The method of claim 1, wherein the set of computer instructions is in source code format prior to application of the method, and the method is carried out before or during compilation of the source code into object code.

13. The method of claim 1, wherein the transformation function is included in the second table.

14. The method of claim 1, further comprising increasing the length of the first table and putting padding values in additional entries of the first table.

15. The method of claim 1, wherein the method is performed on a computing device programmed to do such.

16. The method of claim 1, wherein the method is carried out by computer code stored on a computer program product.

17. The method of claim 1, wherein the set of computer instructions resulting from the method is object code.

18. A method of accessing masked data, the data being in a set of computer instructions stored in a computer readable memory, using a processor coupled to the computer readable memory, the method comprising the acts of:
    the processor detecting a pointer to a table of masked data in the set of computer instructions stored in a first portion of the computer readable memory;
    upon detecting the pointer, the processor accessing a second table stored in a second portion of the computer readable memory, the second table including a plurality of entries, each entry corresponding to a table of data and having a length and starting address of the corresponding masked table of data and a transformation function;
    the processor modifying the masked table of data pointed to by the detected pointer, so the masked table of data is modified by the transformation function so as to be unmasked; and
    storing the unmasked table of data in the computer readable memory.

19. The method of claim 18, wherein the set of computer instructions includes a third table of data and a second pointer to the third table of data, and further comprising applying the method to the third table of data.

20. The method of claim 18, wherein the transformation function is one of an affine transformation, a multiplication by a modulus of a length of the first table, or a permutation.

21. The method of claim 18, wherein the act of modifying the detected pointer includes invoking a handler.

22. The method of claim 18, wherein the transformation function is a bijection.

23. The method of claim 18, wherein each entry in the second table also includes the transformation function for that pointer.

24. The method of claim 18, wherein the pointer is an absolute or an offset pointer.

25. The method of claim 18, wherein the method is performed for each access to the masked table of data.

26. The method of claim 18, further comprising the acts of:
    providing a third table of data; and
    applying the transformation function to the masked and third tables of data, thereby to de-concatenate the tables.

27. The method of claim 18, wherein additional data is appended to the masked table of data, thereby being a third table; and further comprising the act of applying a transformation function only to the additional data in the third table.

28. The method of claim 18, wherein the transformation function is included in the second table.

29. The method of claim 18, wherein predetermined entries of the second table contain padding values.

30. The method of claim 18, wherein the method is performed by a computing device programmed to do such.

31. The method of claim 18, wherein the method is carried out by computer code stored on a computer program product.

* * * * *